Sept. 25, 1934.    R. DOORENTZ    1,974,951

SOUND DAMPING INTERMEDIATE LAYER FOR CEILINGS, WALLS, AND THE LIKE

Filed Nov. 1, 1930

Inventor:

Patented Sept. 25, 1934

1,974,951

UNITED STATES PATENT OFFICE 1,974,951

SOUND DAMPING INTERMEDIATE LAYER FOR CEILINGS, WALLS, AND THE LIKE

Richard Doorentz, Leipzig, Germany

Application November 1, 1930, Serial No. 492,769
In Germany November 18, 1929

1 Claim. (Cl. 20—4)

This invention relates to a new sound damping intermediate layer for ceilings, walls, doors and the like.

Hitherto very thick sound damping layers were employed for rendering ceilings, walls and the like, as impervious as possible to sound. For example peat slabs, ground cork, cork laths, pure cork or peat meal were employed in comparatively thick layers together with a thick layer of roasted sand, and the two layers were separated by cardboard from one another or also from the floor.

Only a limited success has however been obtained with these means in spite of the fact, that the sound damping layers were made about 4 to 5 cms. thick.

The present invention relates to a novel sound damping intermediate layer, which effects a much greater insulation of sound with considerably less thicknesses. At the same time the new intermediate layer is much simpler to build up and fit than the known insulating means and entails less expense.

The new sound insulating intermediate layer consists of two or more layers, for example of cardboard, which are separated the one from the other by an air space and possess the novel feature that the superposed layers are held at a distance apart by a network-like support, for example a loosely woven fibre fabric.

Two embodiments of the invention are illustrated by way of example in the accompanying drawing in which.

Figure 1:
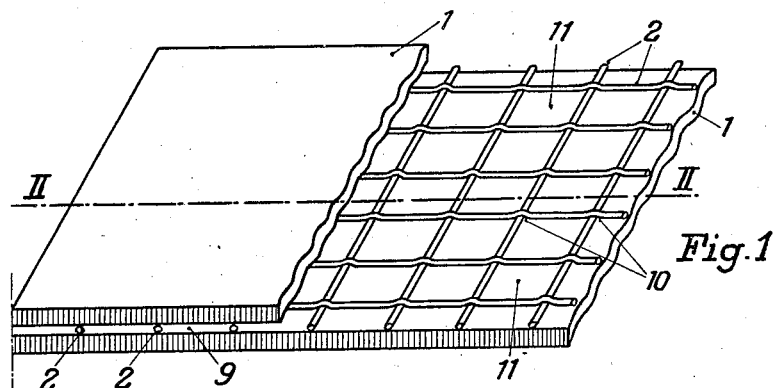
Fig. 1 shows the new insulating intermediate layer in perspective view.

1 are two superposed cardboard layers, between which a netting 2 is inserted, 9 is the thin air layer, 10 are the intersecting points of the netting 2, on which the paper layers 1 rest.

The application is for example as follows:
A continuous layer of cardboard is arranged on a supporting ceiling 4. For this purpose raw pasteboard, felt cardboard, tarred cardboard and the like are used as required. A fabric or netting 2 of textile threads or other suitable material is placed on the layer 1. Finally a second continuous layer of cardboard is laid on the netting 2, on which cardboard layer the floor is applied. The netting 2, for example loosely woven fibre fabric, keeps the two layers of cardboard 1 apart so that a narrow air space 9 is produced.

Air spaces have already been employed for sound insulation, but these have never been as narrow as the space 9 used in the invention. Further large air spaces or thick air layers have been enclosed in the sound damping intermediate layer, but with the contrary effect. Resonance effects were produced, which impaired the sound damping.

The air space 9 according to the invention is so narrow that resonance effects cannot occur. The size of the gap between the cardboard layers 1 is determined in the first place by the points of intersection or knots 10 of the netting 2.

The exceptionally large number of these knots or points of intersection affords firstly a very large number of supporting points between the cardboard layers 1. For example, in a netting having meshes 5 mm. in width not less than 40,401 knots 10 are present on each square meter so that with an admissible load of 350 kgs./m² only 8.7 grms. have to be supported by each knot 10, if the effect of the floor, which distributes the load, is not taken into consideration at all. The new intermediate layer therefore transmits the external loads in a very uniform manner. The sound damping intermediate layer is moreover divided by the netting 2 into a very large number of very small sections 11. For example in the case of meshes 5 mm. in width altogether 40,000 meshes or sections 11 occur in each square meter. Only slight sound vibrations are possible in these sections 11 so that the approaching sound waves are very considerably weakened. These weakened vibrations can moreover be only transmitted to a slight extent within the range of the knots 10, on account of the narrow air space 9. For all ordinary conditions therefore an intermediate layer composed of two layers of cardboard and one layer of fabric or netting 2 is sufficient.

Experiments have shown, that with this surprisingly simple intermediate layer a sound insulation is obtained, which is about 4 to 6 times as effective as that obtained with the former thick layers. These latter require, including floor and linoleum, a constructional height of about 6 to 8 cms., whereas with the new sound damping layer, including the floor and the linoleum, a thickness of 3 cms. need not as a rule be exceeded.

Only in the case of exceptional conditions does an increased thickness of the intermediate layer come into question, which according to the invention can be obtained by employing three layers of cardboard and two layers of fabric or four layers of cardboard with three layers of fabric.

The netting 2 may be constructed in different manners. It may be laid as an independent element between the cardboard layers 1. However one or both of the layers may be constructed with raised portions or bridges corresponding to the knots 10.

In the drawing two forms of construction are illustrated.

Figure 2:
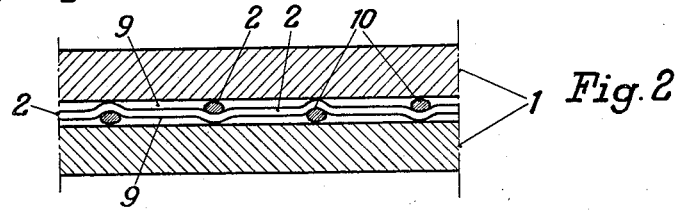
Fig. 2 is a section on line II—II of Fig. 1.
Figure 3:
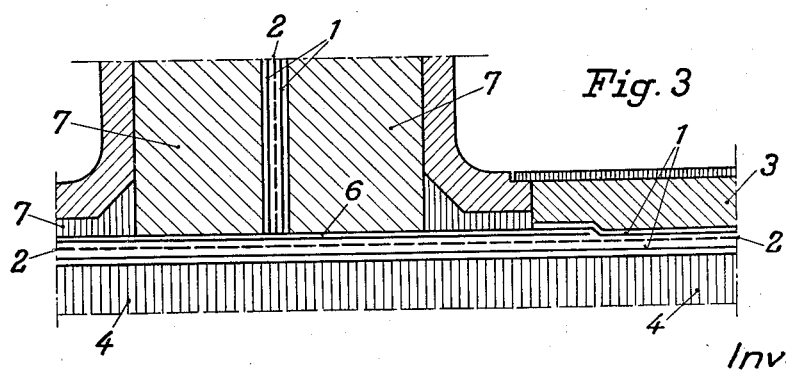
Fig. 3 shows the new insulating intermediate layer in use on a ceiling insulation and wall insulation with a dry floor (hard cast asphalt).

In Fig. 3 a sound insulation according to the invention is enclosed between the two halves 7, 7 of a vertical wall. This insulation consists of the two layers of cardboard 1 (raw pasteboard) and the fabric or netting 2 between same. The drawing shows the composition of the insulation diagrammatically. In reality the two layers of cardboard 1 lie directly on the fabric 2 as shown in Figs. 1 and 2.

The ordinary lower layer of cardboard 1 of the sound insulation is placed directly on the supporting ceiling 4 (Fig. 3). On this layer the fabric 2 is placed. As far as the moisture effect of the vertical wall 7 extends, a tarred cardboard 6 is laid on the fabric 2. On the right of the vertical wall, where the floor 3 commences, a layer of cardboard 1 is again placed over the fabric 2, which, like the lower layer of cardboard 1, may be of raw pasteboard or felt cardboard, because the floor 3 in Fig. 3 is made of hard asphalt.

Figure 4:
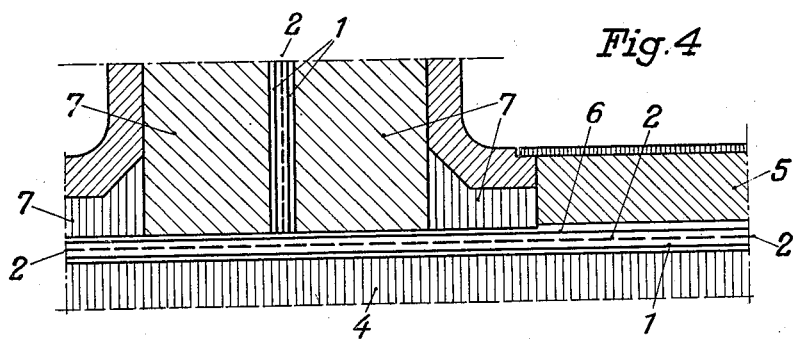
Fig. 4 shows the same used with a wet floor (gypsum or cement floor).

In Fig. 4 the vertical wall is also constructed like that shown in Fig. 3, whereas on the supporting ceiling 4 are superposed a layer of raw pasteboard or felt cardboard 1, a layer of fabric or netting 2 and a continuous tarred cardboard layer 6, that is three layers, which form the sound insulation. The tarred cardboard 6 extends here continually over the entire ceiling 4, because a wet floor, for example of cement or gypsum, is applied over the sound insulation.

I claim:

A building structure, comprising in combination with ceilings and walls, two outer layers composed of cardboard, and an inner layer of soft fabric netting loosely interposed between said outer layers, the knobs and threads of said netting adapted to maintain said cardboard layers at a certain distance apart and free from rigid connections and dividing the air space between the cardboard layers into a great number of air containing cells, the intermediate layer being inserted between and held together by the different layers of said ceiling or wall.

RICHARD DOORENTZ.